(12) United States Patent
Wittkopp

(10) Patent No.: US 7,469,610 B2
(45) Date of Patent: Dec. 30, 2008

(54) REVERSE AND PARK INHIBITOR APPARATUS IN A TRANSMISSION CONTROL MECHANISM

(75) Inventor: Scott H. Wittkopp, Ypsilanti, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 157 days.

(21) Appl. No.: 11/212,891

(22) Filed: Aug. 26, 2005

(65) Prior Publication Data
US 2007/0044584 A1 Mar. 1, 2007

(51) Int. Cl.
*F16H 59/00* (2006.01)
*B60K 20/00* (2006.01)

(52) U.S. Cl. ...................... 74/335; 74/473.21

(58) Field of Classification Search ............... 74/473.21, 74/473.22, 473.23, 473.24, 473.25, 473.26, 74/473.27, 335
See application file for complete search history.

(56) References Cited

U.S. PATENT DOCUMENTS

| 2,097,566 | A | * | 11/1937 | Hummer | 74/473.33 |
| 5,695,029 | A | * | 12/1997 | Yokoyama et al. | 192/219.6 |
| 2002/0020236 | A1 | * | 2/2002 | Onodera | 74/335 |

* cited by examiner

*Primary Examiner*—Charles A Marmor
*Assistant Examiner*—Derek D Knight

(57) ABSTRACT

A park/reverse inhibiting apparatus is disposed within a transmission control mechanism to inhibit movement of a cam plate selected from a forward or neutral position to a reverse position or park position when the vehicle speed is above a predetermined value. The inhibiting apparatus will also prevent movement from the reverse position to the park position depending upon the vehicle speed.

8 Claims, 5 Drawing Sheets

REVERSE AND PARK INHIBITOR APPARATUS IN A TRANSMISSION CONTROL MECHANISM

TECHNICAL FIELD

This invention relates to manually shifted transmission controls and, more particularly, to manually shifted transmission controls including a park position.

BACKGROUND OF THE INVENTION

So-called manual or countershaft or mechanical transmissions have a plurality of shift forks, which control the positioning of synchronizers within the transmission. The synchronizers establish the gear ratios between the transmission input shaft and the transmission output shaft. More recently, it has been proposed to employ synchronizer mechanisms or mechanical clutches with planetary type transmissions wherein two or more synchronizers are engaged simultaneously to establish the gear ratios within the planetary transmission.

Either of these types of transmissions, countershaft or planetary, have at least a reverse gear and planetary transmissions normally have a park gear. It is known to employ a mechanism for retarding or inhibiting the shift into a park or reverse condition when forward travel of the vehicle is underway. The inhibitor mechanisms are most often found directly on the manual shift tower and many of these require the use of a manual input such as a button or lever to unlock or disengage the inhibiting mechanism so that the reverse gear can be selected.

SUMMARY OF THE INVENTION

It is an object of the present invention to provide an improved park/reverse inhibitor for manually shifted transmissions.

In one aspect of the present invention, the inhibitor apparatus is disposed within the transmission housing adjacent a portion of the control mechanism.

In another aspect of the present invention, the inhibitor apparatus includes a lever, which is pivotally mounted within the transmission housing and aligned with a portion of the transmission shift control in the inhibited condition.

In yet another aspect of the present invention, the park/reverse apparatus is pivoted out of the inhibited position by a solenoid system to permit reverse and park selection by the operator.

In still another aspect of the present invention, the park/reverse inhibiting mechanism inhibits the movement from the park position to the reverse position under controlled conditions.

In yet still another aspect of the present invention, the shift apparatus includes a cam plate movable in both longitudinal and lateral directions wherein the park/reverse inhibiting mechanism permits the longitudinal movement until a release signal is given.

DESCRIPTION OF AN EXEMPLARY EMBODIMENT

Figure 1:
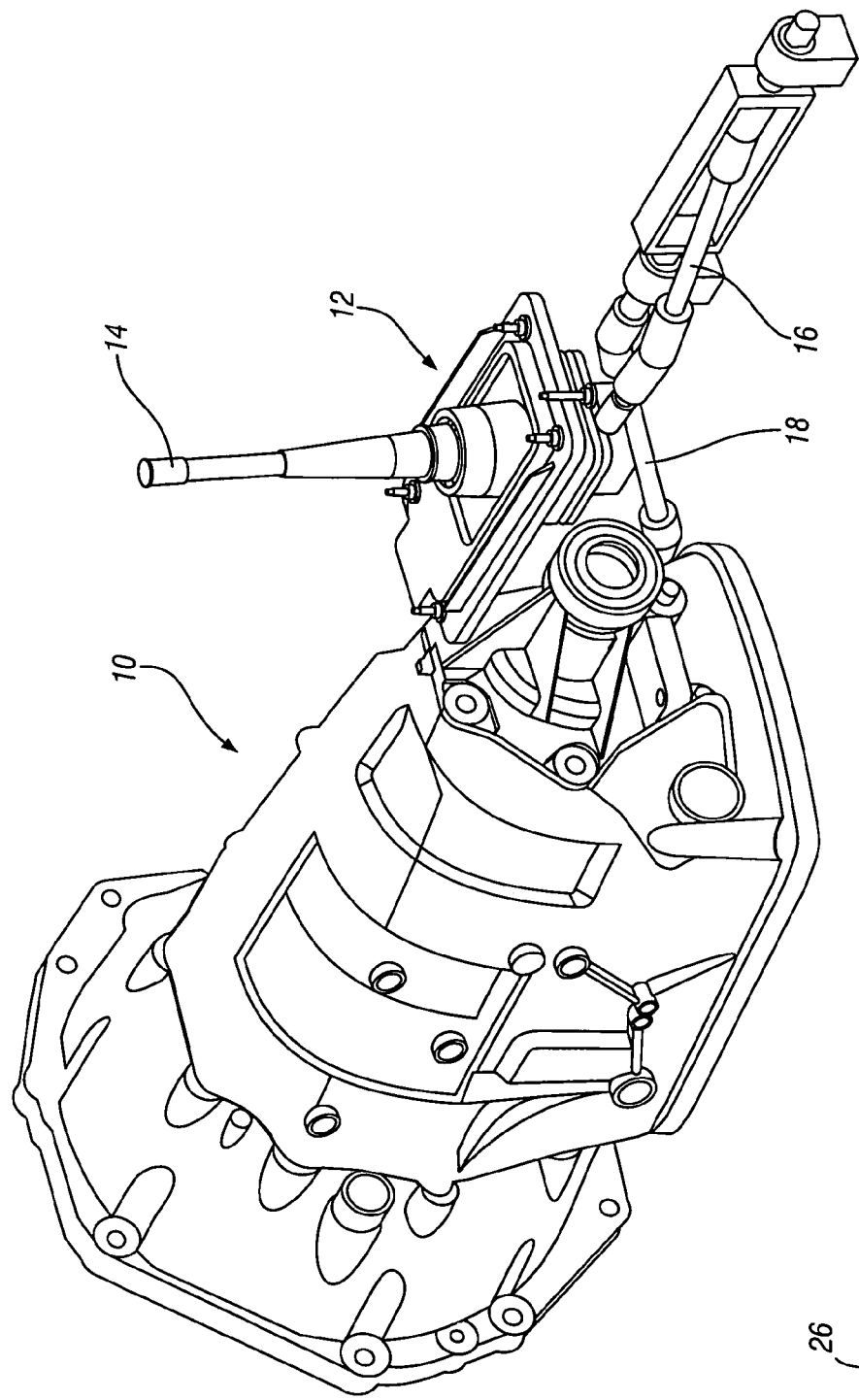
FIG. 1 is an isometric view of a transmission control system displaying the manual shift lever mechanism.

Referring to the drawings, wherein like characters represent the same or corresponding parts throughout the several views, there is seen in FIG. 1 a power transmission 10 having a shift control mechanism 12. The shift control mechanism 12 includes a manual shift lever 14, which is operable to manipulate a pair of control rods or cables 16 and 18.

Figure 1A:
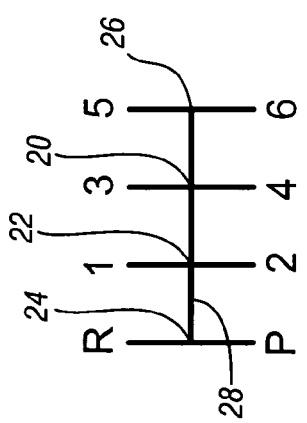
FIG. 1A is a diagrammatic view of a shift pattern.

The shift pattern traversed by the manual shift lever 14 is shown in FIG. 1A and includes a 3-4 neutral position 20, a 1-2 neutral position 22, a Reverse-Park neutral position 24, and a 5-6 neutral position 26. The general or spring set neutral position is 20 at the 3-4 intersection. This permits the driver or operator to know the position that the shifter will assume if moved to neutral and released. Thus, the driver or operator always knows the starting position from a pre-neutral so that the direction of the control can be determined.

When the shift control lever 14 is moved transversely along a line 28, the driver is selecting the neutral position 20, 22, 24, or 26, and when the shift lever 14 is moved longitudinally relative to the vehicle, the driver will select a first or second position, a third or fourth position, a fifth or sixth position, or a Reverse or Park position. If the operator moves the shift lever 14 from a neutral position, for example neutral position 22, longitudinally of the vehicle, either the first gear or second gear is selected. If the operator moves the shift lever 14 longitudinally from the neutral position 20, either the third or fourth gear is selected. If the shift lever 14 is moved longitudinally from the neutral position 26, either the fifth or sixth gear is selected. If the operator moves the shift lever 14 transversely to the neutral position 24 and then longitudinally, either the Reverse or Park position is selected. This commonly termed an "H" pattern of shifting, which is well known to those skilled in the art.

Figure 2:
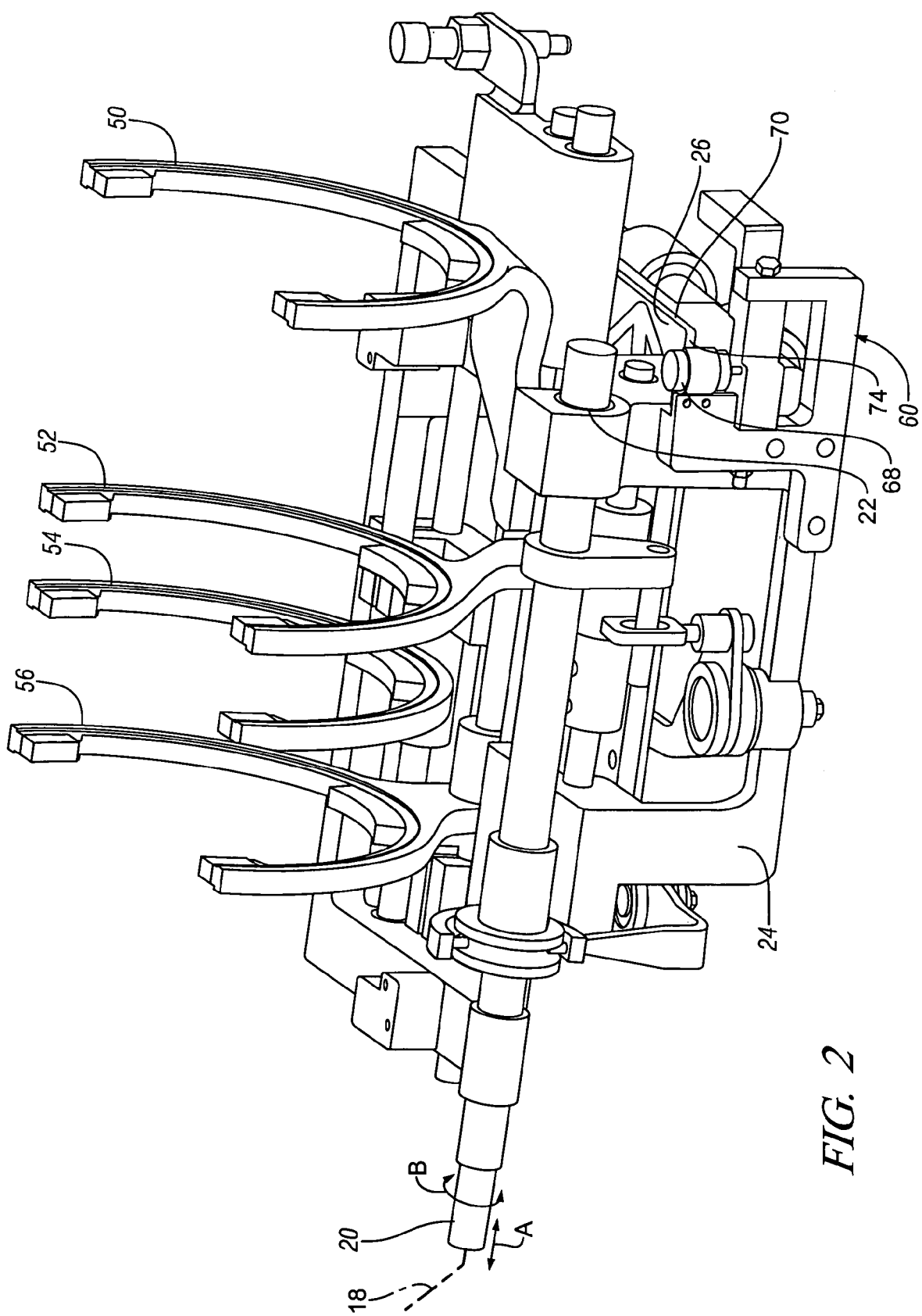
FIG. 2 is an isometric view of a portion of the transmission control incorporating the present invention.

As seen in FIG. 2, the control rod or cable 18 connects with a control shaft 20, which is slidably and rotatably disposed in a bearing 22 positioned on a control frame 24. The control rod 20 is movable in the direction of Arrow A to permit selection between a pair of ratios and rotatable in the direction of Arrow B to complete the ratio selection. This can be seen in FIG. 4, which is an outline of a cam plate 26, which is a portion of the shift control seen in FIGS. 2, 3, and 5.

The cam plate 26 has five slots or cam portions 28, 30, 32, 34, and 36. The cam slots 28 are neutral slots in that the engagement with this slot maintains the plate 26 in the proper orientation for the other gear selections. When the plate 26 is moved laterally, by movement of the control rod 20 in the direction of Arrow A, a pin member 40 moves along the neutral portion 38 of the cam portion 28. When the plate 26 is moved transversely, through rotation in the direction of Arrow B of the shaft 20, the pin 40 will move into one of the laterally positioned slots 42, 44, 46, or 48. The slot 42 is the 3-4 ratio selection slot. The return spring neutral position is adjacent the 3-4 slot in the slot 38. The slot 44 is the 1-2 ratio slot, the slot 46 is the park/reverse slot, and the slot 48 is the 5-6 ratio slot. Each of the other cam portions 30, 32, 34, and 36 have similar positions, however, it can be seen that each of these cam portions has a different configuration which will provide for the control of the shift forks within the control mechanism.

The cam plate 26 controls the positioning of four shift forks 50, 52, 54, and 56. Each of the shift forks has a control rail such as 58, which controls the shift fork 50. The shift rail is moved laterally within the transmission to provide the gear selection desired by the operator. Each of the cam portions 28, 30, 32, 34 and 36 is controlled by a pin, such as pin 40, which extends into the respective cam portions 28, 30, 32, 34 and 36 of the cam plate 26.

Figure 3:
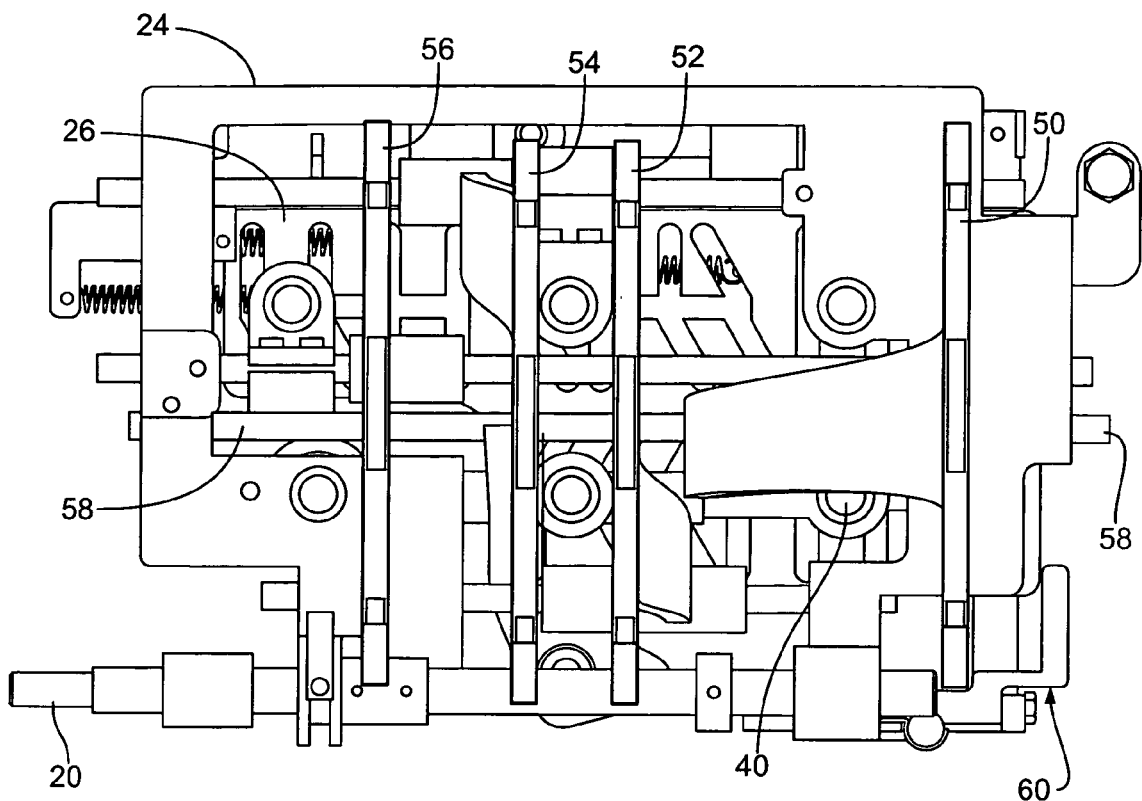
FIG. 3 is a top view of the control portion shown in FIG. 2.
Figure 4:
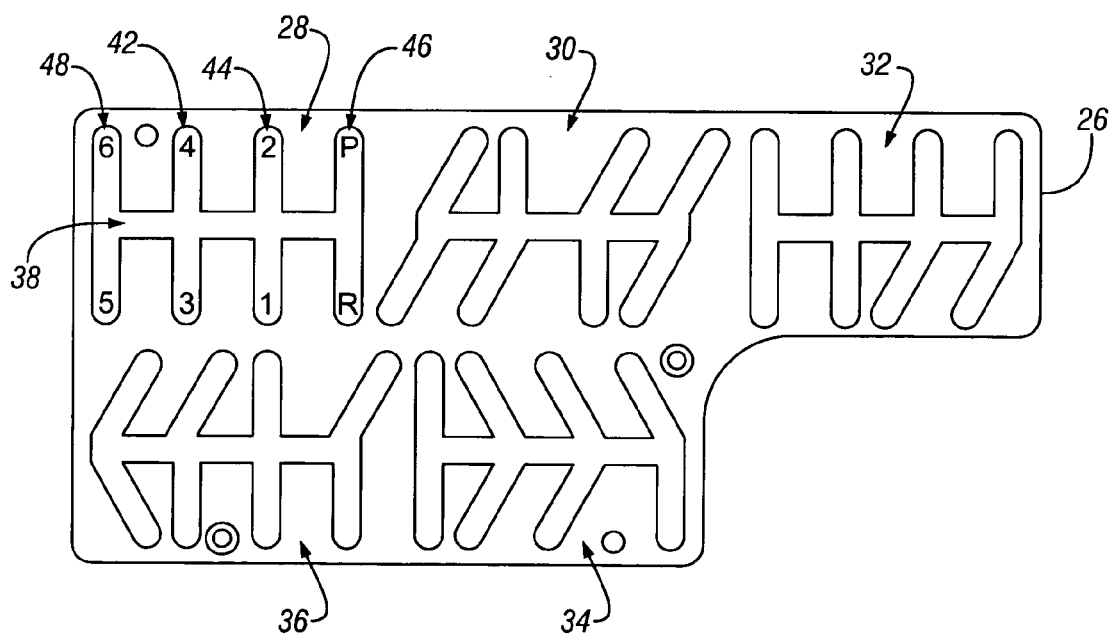
FIG. 4 is a plan view of the shift pattern on the cam plate disposed within the shift control.
Figure 5:
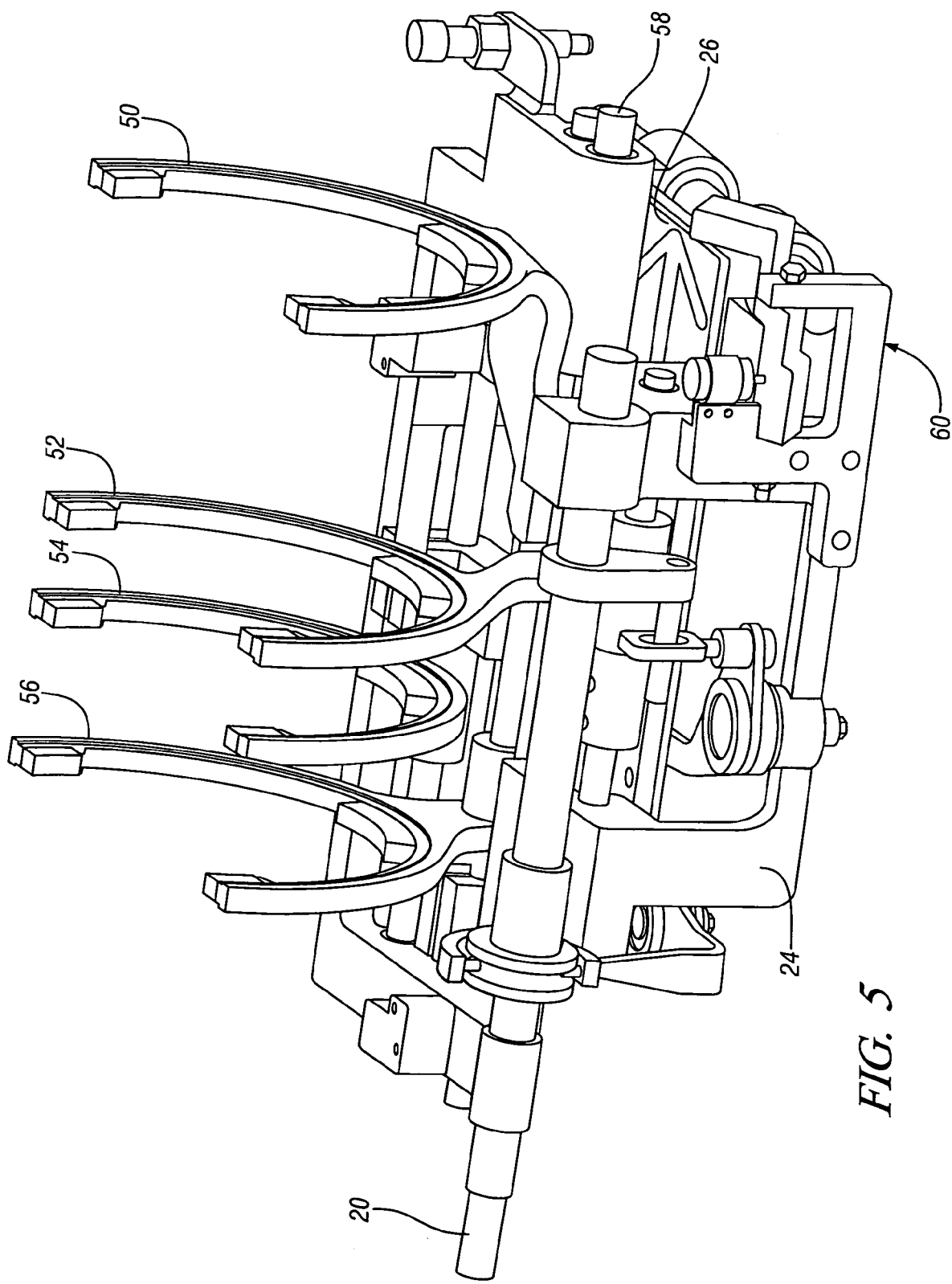
FIG. 5 is an isometric view of the portion of the control system incorporating the present invention shown in the uninhibited condition.
Figure 6:
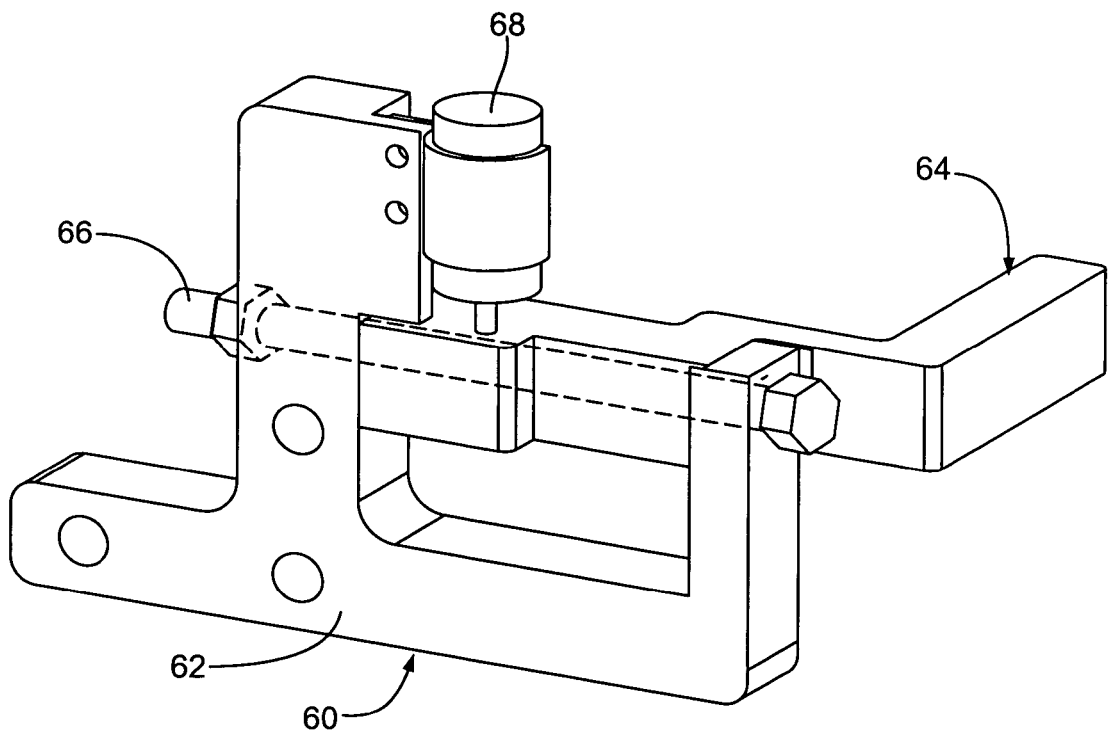
FIG. 6 is an isometric view of the reverse/park inhibiting apparatus in the uninhibited position.
Figure 7:
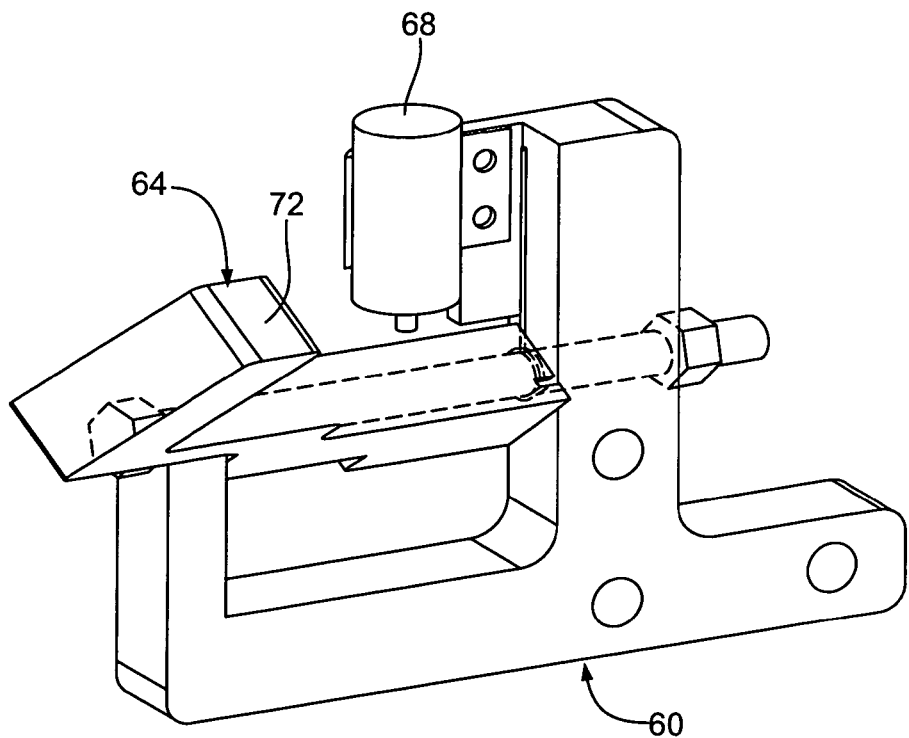
FIG. 7 is a view similar to FIG. 6 showing the reverse/park apparatus moved to the inhibiting position.

The cam plate 26 is inhibited when moving rightward as seen in FIGS. 1, 3, and 5 by a reverse/park inhibitor mechanism 60. As best seen in FIGS. 6 and 7, the reverse/park inhibitor mechanism 60 has a base or housing 62, which is secured to the transmission through the stationary member 24. The base or housing 62 pivotally supports a lever or switch 64 on a shaft 66. The lever 64 is pivotal on the shaft 66 by a speed controlled solenoid 68. When the speed of the vehicle is below a predetermined value, for example five miles an hour, the solenoid 68 can be energized to move the lever 64 to the pivoted position shown in FIG. 6.

In the unshifted or inhibiting position shown in FIG. 7, the lever 64 will abut an end 70 of the cam plate 26 to inhibit further longitudinal movement of the plate by the control rod 20 until the lever 64 is pivoted to the uninhibiting position, shown in FIG. 6. The solenoid 68 will cause the pivoting of the lever 64 when the vehicle speed is below the predetermined value. This permits the operator to move the cam plate 26 to the reverse position such that the shift forks 50, 52, 54, and 56 can be properly positioned.

As can be seen from the outline of the cam portions 30 and 32, two of the shift forks will be positioned during the reverse selection. In the park selection, it can be seen from the cam slots 30, 34, and 36, that three of the shift forks will be positioned by the cam plate 26. When the park/reverse inhibitor mechanism 60 and the shift lever 64 thereof is moved to the uninhibited position, the cam plate 26 can be moved fully rightward by the control shaft 20.

If the operator then selects the reverse position and the vehicle speed is increased, the solenoid 68 will be deenergized permitting the lever 64 to return to the inhibiting position. In the inhibiting position, the lever 64 has a face 72, which will abut a surface 74 on the cam plate 26 preventing movement from the reverse position to the park position. The cam plate 26 can not be moved to the neutral slot 38 before the face 72 abuts the cam plate 26 at surface 74. In addition, the park position cannot be achieved unless the vehicle speed is again below the predetermined value, which will permit the solenoid 68 to move the lever 64 to the uninhibited position thereby permitting the cam plate 26 to be moved to the park position.

The park/reverse inhibitor provides two functions, as explained above. It inhibits selection of both the park and reverse positions when the speed is above a predetermined value and inhibits movement from the reverse position to the park position when the speed is above a predetermined value. Of course movement from the park position to neutral is uninhibited since the vehicle will be stationary when the park position has been selected.

The invention claimed is:

1. A park/reverse inhibiting apparatus in a transmission control mechanism comprising:
   a cam plate within the control mechanism shift control;
   means for moving said cam plate laterally and transversely from a neutral position to a reverse position and a park position;
   a stationary housing pivotally mounting an inhibiting lever;
   a solenoid means for controlling pivotal movement of said inhibiting lever relative to said cam plate to position said inhibiting lever to inhibit movement of said cam plate to said reverse and park positions, and pivotal to a second position to permit movement of said cam plate to either said reverse or park positions; and
   said inhibiting lever is operable to inhibit movement from said reverse position to said park position after selection of said reverse position has been achieved and a vehicle speed indicator recognizes a vehicle speed above a predetermined value.

2. The apparatus of claim 1 wherein the cam plate includes at least one cam portion.

3. The apparatus of claim 2 wherein the cam plate controls at least one shift fork.

4. The apparatus of claim 3 wherein the transmission control mechanism controls a transmission having six forward gears and one reverse gear.

5. The apparatus of claim 1 wherein the stationary housing comprises:
   a first portion having a first end secured to the a stationary member of the transmission control mechanism and a second end opposite the first end;
   a second portion having a first end fixedly connected perpendicularly to the second end of the first portion and a second end opposite the first end; and
   a third portion having a first end fixedly connected perpendicularly to the first portion between the first end and the second end of the first portion and having a second end opposite the first end, and
   wherein the first, second, and third portions are in a common plane.

6. The apparatus of claim 5 further comprising a shaft having a first end rotatably supported by the second portion of the housing and a second end opposite the first end rotatably supported by the third portion of the housing, wherein the shaft is substantially parallel to the first portion of the housing.

7. The apparatus of claim 6 wherein the inhibiting lever includes:
   a first portion having a first end, a second end opposite the first end, a first side and a second side opposite the first side, wherein the first portion is concentric with the shaft and defines a pivot axis;
   a second portion connected to the first end of the first portion of the inhibiting lever on the first side of the first portion of the inhibiting lever; and an inhibiting portion connected perpendicularly to the second end of the first portion of the inhibiting lever extending from the second side of the first portion of the inhibiting lever and including at least one inhibiting face; and wherein the second portion acts to rotate the inhibiting lever to the inhibiting position when the solenoid means are not energized.

8. The apparatus of claim 7 wherein the solenoid means includes:

a mounting portion connected to the second end of the third portion of the stationary housing;

a solenoid connected to the mounting portion and having an member operable to extend beyond an end of the solenoid upon energizing the solenoid; and wherein upon energizing the solenoid, the member extends to contact the second side of the first end of the first portion of the inhibiting lever thus causing the inhibiting lever to pivot about the pivot axis to an uninhibited position.

* * * * *